United States Patent [19]
Garrett et al.

[11] Patent Number: 5,221,304
[45] Date of Patent: Jun. 22, 1993

[54] PROCESS VESSELS

[75] Inventors: Michael E. Garrett, Working; John Coates, Farnham, both of England

[73] Assignee: The BOC Group plc, Surrey, England

[21] Appl. No.: 693,831

[22] Filed: Apr. 30, 1991

[30] Foreign Application Priority Data

Mar. 5, 1990 [GB] United Kingdom ............. 9010047

[51] Int. Cl.⁵ .......................................... B01D 39/00
[52] U.S. Cl. .................................................. 55/387
[58] Field of Search ............... 55/387, 179; 220/408, 220/453, 565, 568

[56] References Cited

U.S. PATENT DOCUMENTS

| | | | |
|---|---|---|---|
| 3,397,511 | 8/1968 | Dwyer et al. | 55/208 |
| 3,404,500 | 10/1968 | Akita et al. | 220/565 |
| 4,175,005 | 11/1979 | Harstead | 176/87 |
| 4,425,743 | 1/1984 | Bartur | 220/565 |

FOREIGN PATENT DOCUMENTS

| | | |
|---|---|---|
| 0234239 | 1/1987 | European Pat. Off. |
| 2940255 | 4/1981 | Fed. Rep. of Germany ........ 55/387 |
| 2119359 | 11/1983 | United Kingdom . |

*Primary Examiner*—Bernard Nozick
*Attorney, Agent, or Firm*—Coleman R. Reap; Larry R. Cassett

[57] ABSTRACT

A process vessel has side walls of concrete which are lined with a gas and moisture-impermeable material to prevent:

a) the egress of gas from the interior of the vessel; and
b) ingress of moisture through the concrete into the interior of the vessel.

7 Claims, 2 Drawing Sheets

1

PROCESS VESSELS

BACKGROUND OF THE INVENTION

This invention relates to process vessels, for example, for use in the separation of a gas mixture.

One well known method of separating a gas mixture is by pressure swing adsorption. In pressure swing adsorption, a bed of molecular sieve adsorbent is employed to separate or extract relatively more of at least one component of a gas mixture admitted to the bed than of the remaining constitutent or constituents of the gas mixture. Accordingly, a gas enriched in the non-adsorbed constituents may be taken from the bed as a product. The bed is then regenerated by being subjected to a lower pressure than the one at which adsorption takes place.

Typically, two or more beds are employed and are operated out-of-phase with one another such that as one bed is adsorbing gas as another is being regenerated and a gaseous product is withdrawn from the plant continuously.

In known apparatus and plant for separating gas by pressure swing adsorption, each bed of molecular sieve is held in a cylindrical steel vessel. The vessels are fabricated at a vessel production site and are then transported typically by road to the site where the gas separation plant is to be installed. Owing to regulations concerning the size of loads which can be transported, there is a limit to the size of the vessels that can be transported. In the UK there are regulations prohibiting the transport of vessels or other loads having a diameter of more than 5 meters. Such regulations place a practical limit on the total capacity of the vessels, as they cannot be of unlimited height without running the risk of the molecular sieve particles being crushed and hence rendered less effective during operation of the plant. Accordingly, if it is desired to install a plant for the separation of gas mixture by pressure swing adsorption that has the capacity to produce gas at a relatively high rate, there is either the choice of fabricating suitably large vessels on the site where the plant is to be used, and this choice is usually impracticable, or, of using an increased number of smaller vessels. Sometimes, however, there is not the area available on the site of use for a large number of such vessels. Moreover, the use of a larger number of vessels containing molecular sieve imposes a need for a greater number of valves to be installed as well as more piping, thereby adding considerably to the cost of the plant.

Analogous problems arise in other processes, for example other gas separation processes using adsorbents, and processes using catalysts.

SUMMARY OF THE INVENTION

According to the present invention there is provided a process vessel having either or both of its base and top formed as a gas distributor and whose side wall or side walls are of concrete, said concrete having a gas impermeable lining.

Such a process vessel is relatively easy to manufacture on-site.

Process vessels according to the invention may be used in a number of different processes. For example, they may be used to hold adsorbent in any adsorptive gas separation process, for example a pressure swing adsorption process, particularly a process in which the pressure does not exceed, say, 2 atmospheres absolute. They may also be used in such processes in which the pressure is higher than 2 atmospheres absolute. In any individual example, the vessel will need to be appropriately designed so as to be able to withstand the pressure regimen to which it is to be subjected in use.

The base of a vessel according to the invention can be fabricated from appropriately lined or treated concrete. If desired, so may the top of the vessel.

The concrete used in a vessel according to the invention may have a lining or coating of natural or synthetic rubber or of a plastics material, the rubber or plastics material being both gas impermeable and impermeable to moisture. Preferably, however, the lining is formed of metal, typically steel. It is then possible to use a metal lining to provide structural strength to the vessel. In addition, it becomes relatively simple to fabricate two or more vessels with the same internal dimensions. Moreover, use of a metal such as steel enables the vessel to be made of a square or rectangular cross-section. In constructing such a vessel, the side walls of the lining, and if desired the base and top, may each be formed of a sheet of metal (preferably steel), the sheets secured fluid tight together, and then the resulting assembly may have the concrete cast onto it, there preferably being anchor lugs extending outwards from each sheet to help provide permanent engagement between the metal sheets and the concrete.

The base is preferably supported by suitable pillars or like members. The concrete for the base and, if employed, for the top is preferably cast having appropriate gas distribution passages or channels therein. The top may if desired be provided with a manway to allow access to be gained to the interior of the finished vessel.

The assembled sheets may if desired be provided with appropriate cross-bracing, either vertically or horizontally, or both, so as to add to the mechanical strength of the vessel.

The sheets may be secured fluid-tight together by means of bolts or the like. Typically, adjoining edges of adjacent sheets may have flanges which are bolted together and which hold under compression suitable seals of, for example, elastomeric or plastics material. Alternatively seals may be effected by welding.

If the vessel is to contain particulate material, for example an adsorbent, it may be charged with the material prior to having the top fitted thereto.

The concrete preferably has internal stiffening members or reinforcement of any known kind so as to help bind the concrete to itself and prevent cracking.

The vessels according to the present invention are preferably made on the site of their use of a size such that they would not be able or be permitted to be transported by road. The vessels are preferably each partially or wholly sunk underground.

In for example U.S. Pat. No. 4 781 735 there is described a process for separating oxygen from air which uses three vessels containing adsorbent particles and one vessels as a reservoir. Each such vessel may if desired be a vessel in accordance with this invention.

A vessel according to the invention is now described by way of example with reference to the accompanying diagrammatic drawings, in which:

Figure 1:
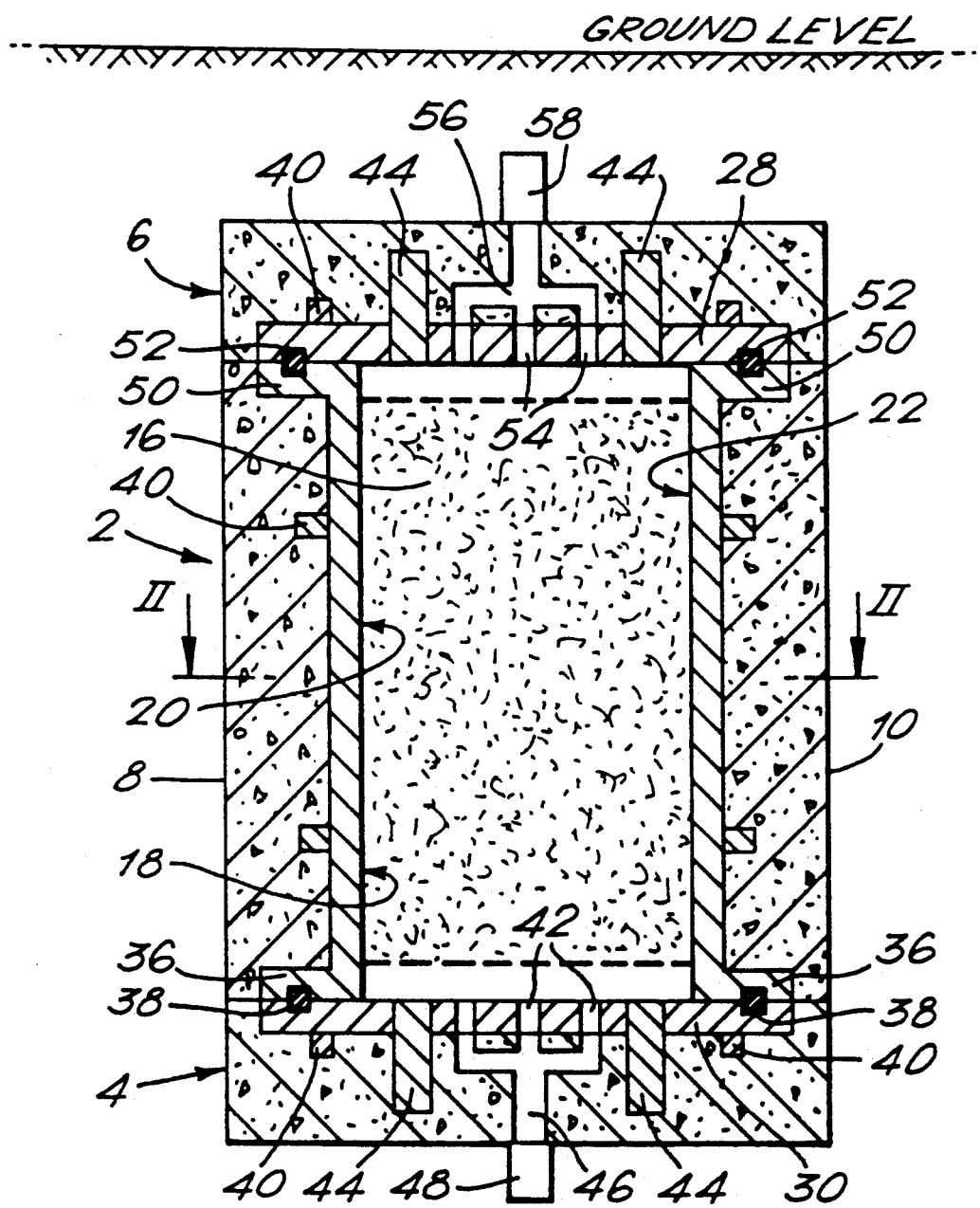
FIG. 1 is a schematic sectional side elevation of a vessel in accordance with the invention.

The drawings are not to scale.

DESCRIPTION OF A PREFERRED EMBODIMENT

Referring to the drawings, a process vessel 2 is generally cuboid in shape. It has a base 4 and a top 6, and pairs of opposite walls 8 and 10, and 12 and 14. The vessel 2 is generally square in cross-section. The vessel 2 is filled with particles of adsorbent 16. The internal volume of the vessel 2 is defined by a gas impermeable lining 18 of galvanised steel. The lining 18 comprises opposite pairs of side walls 20 and 22, and 24 and 26. The lining 18 also has a base 30 and a top 28.

Figure 2:
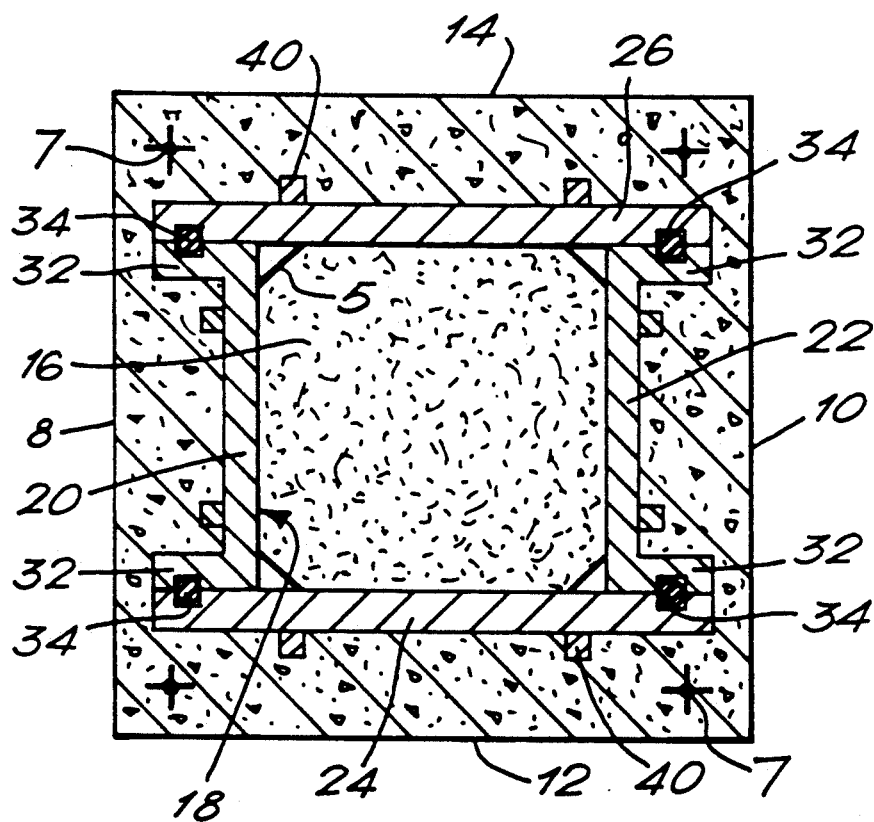
FIG. 2 is a section through the line II—II of FIG. 1.

To fabricate the vessel 2, the lining 18 (save for its top 28) is formed first. Each of the side walls 20, 22, 24 and 26 comprises a sheet of galvanised steel. The sheets may be thick so as to add structured strength to the final vessel 2. They may if desired be braced with support members 5 so as to enhance the structural strength further. As shown in FIG. 2, the walls 20 and 22 are each formed with vertically extending flanges 32. The flanges 32 are bolted to the respective walls 24 and 26. Elastomeric or other sealing members 34 are engaged between each flange 32 and the respective walls 24 and 26.

Accordingly, there is fluid tight engagement along the vertical edges of the cuboid defined by the lining 18. There is a similar engagement between the bottom horizontal edges of the walls 20, 22, 24 and 26, which are all formed with flanges 36, and the base 30. (Only four flanges 36 are shown in FIG. 1.) Accordingly, the flanges 36 are bolted to the base 30 and elastomeric or other sealing members 38 are engaged fluid-tight therebetween. The outer surface of each of the side walls 20, 22, 24 and 26, and the outer surface of the base 28 are formed with integral anchoring lugs 40. Whereas the side walls 20, 22, 24 and 26 are imperforate, the base 30 has gas distribution apertures 42 formed therethrough. In addition, the base 30 is supported on pillars 44 which are each typically of box cross-section.

The walls 20, 22, 24 and 26 and the base 30 then have the concrete cast onto them. Suitable casting moulds are formed about the outer surface of each of the walls 20, 22, 24 and 26 and the base 30, and concrete is then poured into the moulds. Reinforcement, such as by rigid members 7, is preferably provided for the concrete. The anchoring lugs 40 ensure that there is adequate engagement between the lining 18 and the concrete. The section of concrete at the base 30 of the lining 18 is formed about the pillars 44. It is formed with gas passages 46 which register with the apertures 42 and with a gas port 48.

The vessel 2 may if desired then be filled with the adsorbent particles 16. The top sheet 28 of galvanised steel may subsequently be bolted to flanges 50 of the walls 20, 22, 24 and 26 with elastomeric sealing members 52 engaged fluid-tight therebetween. The top sheet 28 has apertures 54 complementary to the apertures 42. The top sheet 28 also has anchoring lugs 40 and pillars 44. When in position, the sheet 28 may have the concrete cast onto it about the pillars 44 in a manner as described above. The concrete is provided with reinforcement. The section of concrete engaging the sheet 28 of the lining 18 has gas passages 56 which register with the apertures 54 in the sheet 28 and with a gas port 58. The top of the vessel 2 is also provided with a manway (not shown) which if desired may also function as a port through which the vessel 2 may be filled with adsorbent. Accordingly, if desired, the top 28 of the lining 18 may be bolted in place first and all six walls of the lining having concrete cast onto them prior to the vessel 2 being filled with adsorbent 16.

The lining 18 is effective both to prevent the egress of gas from the vessel 2 and to prevent the ingress of moisture into the interior of the vessel 2 through the concrete.

The vessel 2 may for example be used as an adsorbent vessel in the process described in U.S. Pat. No. 4 781 735.

We claim:

1. An adsorption gas separation apparatus comprising at least one process vessel containing a bed of adsorbent supported across the interior of said vessel and having a concrete top wall with at least one gas distribution port formed therein, a concrete base wall with at least one gas distribution port formed therein, and at least one concrete sidewall, the inside surfaces of said top wall, said base wall and said at least one sidewall being lined in fluid-tight manner with a moisture- and gas-impermeable lining made of a material selected from the group consisting of rubber, plastics and metal.

2. The adsorption gas separation apparatus of claim 1, in which said concrete is reinforced.

3. Adsorptive gas separation apparatus as claimed in claim 1, in which the process vessel is located partially or entirely underground.

4. The adsorption gas separation apparatus of claim 1, in which the vessel is of rectangular cross-section.

5. The adsorption gas separation apparatus of claim 1, in which said lining is metal.

6. The adsorption gas separation apparatus of claim 5, in which said lining comprises galvanized steel sheets secured together in a fluid-tight manner.

7. The adsorption gas separation apparatus of claim 6, in which the assembled lining is braced.

* * * * *